Figure 1:
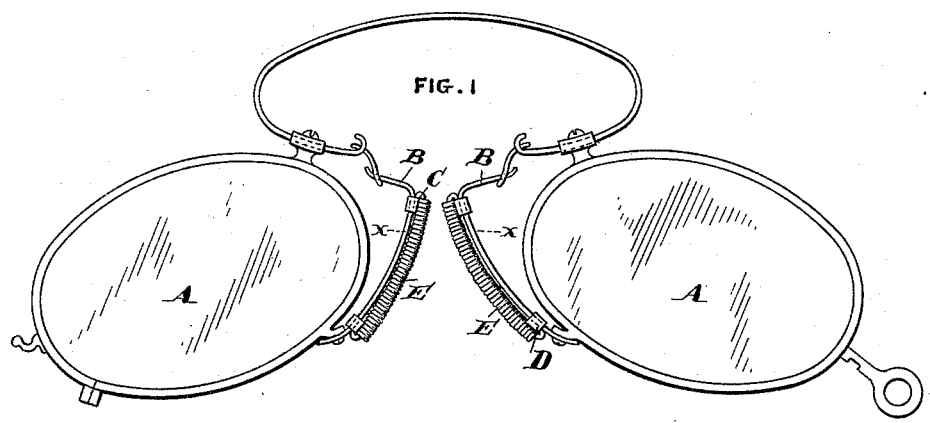

(No Model.)

S. B. OPDYKE.
EYEGLASSES.

No. 426,625. Patented Apr. 29, 1890.

Attest:
Henry Drury

Inventor:
Stacy B Opdyke
by his attorney
G. J. Harding

UNITED STATES PATENT OFFICE.

STACY B. OPDYKE, OF NEW HAVEN, CONNECTICUT.

EYEGLASSES.

SPECIFICATION forming part of Letters Patent No. 426,625, dated April 29, 1890.

Application filed May 7, 1888. Serial No. 273,045. (No model.)

*To all whom it may concern:*

Be it known that I, STACY B. OPDYKE, a citizen of the United States, and a resident of the city and county of New Haven, State of Connecticut, have invented a new and useful Improvement in Eyeglasses, of which the following is a full, clear, and exact description, reference being had to the accompanying drawings, which form part of this specification.

The effectiveness of eyeglasses and spectacles depends in a very large degree upon the firmness or fixity with which they sit upon the bridge of the nose. If the glasses are allowed to move upon the nose, even in a slight degree, so as to throw the axis of the glass out of its proper position, the focus will be out of place and the eyesight will consequently be injured by the strain thus exerted. For this reason many oculists object to the use of the favorite pince-nez and prefer the spectacles having the supports over the ears of the wearer. In the former glasses to correct the fault it has been found necessary to provide the spring-clasps, which hold the glasses upon the nose, with roughened edges, usually constructed of gutta-percha or similar substances, the effect of which, from the pinching due to the springs, is very unpleasant to the wearer. This does not hold the glasses with sufficient firmness, because of its rigidity and the resulting impossibility of fitting its gripping-edges to the shape of the bridge of the nose. In place of forming a good contact over an extended surface, but two or three points of contact are made, and the unevenness in the grip has a tendency to displace the glasses.

It is the object of my invention to obviate these difficulties by providing a suitable covering for the spring parts, which has the effect of holding the glasses firmly upon the bridge of the nose. My invention is not, however, limited to pince-nez glasses, but is also adapted to the ordinary spectacles, in which the bridge may be covered by the material to form a soft and springy rest.

The essential feature of my invention is the covering or otherwise providing of the parts which rest upon or grip the nose with a soft surface formed of horse-hair or other animal or vegetable fiber, forming a series of independent gripping parts, each of which adjusts itself to the shape of the nose with which it is in contact, and without displacement of the other parts. Besides this improved gripping action, the softness of the parts makes it very pleasant to the wearer after use of the spectacles or eyeglasses heretofore found upon the market.

Specific applications of the subject-matter of this application form the subject-matter of applications filed by me May 7, 1888, and respectively serially numbered 273,046 and 273,047.

Figure 2:
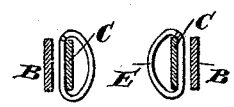
Figure 4:
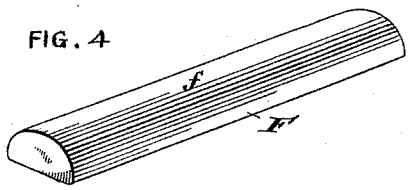
Figure 3:
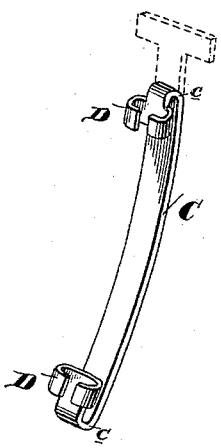
Figure 5:
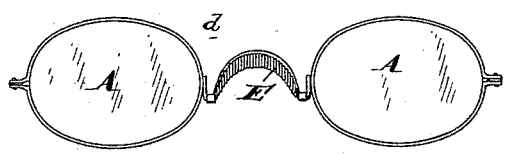

In the drawings, Figure 1 is a front elevation of a pair of ordinary pince-nez glasses with my improvement thereon. Fig. 2 is a cross-sectional view of the spring nose-clasp through the line $x\ x$ of Fig. 1. Fig. 3 is a perspective view of the piece by which my improved covering is supported and secured to the glasses. Fig. 4 is a perspective view of the temporary former used in covering the piece (shown in Fig. 3) with my improved covering; and Fig. 5 is a front elevation of a pair of ordinary spectacles, showing the adaptation of my invention to that form of glasses.

A are a pair of the ordinary glasses constructed in the usual manner, having the spring nose-clasps B, which are constructed without roughened edges or other means to hold the glasses firmly upon the nose.

C are two pieces, preferably of thin metal, which may be slightly curved in shape, as shown in Fig. 3, bent over on their ends, as at $c$, and having the clasps D, by which they may be attached to the spring nose-clasps B. The former F, preferably having a curved face $f$, is placed upon the front of the piece C, and over this is tightly wound a strand or covering material E, the ends of which are held under the bent-over ends $c$ of the piece C. The former is then withdrawn and the pieces C are secured by the clasps D to the nose-clasps B. The strip of metal C has its ends bent out flat, as shown in dotted lines in Fig. 3, when the material E is being wound upon it, and after it is secured by the ends being bent down, as at $c$, the covered strip is then attached to the nose-clasps by the clasps D, which are bent around them, as shown in Fig. 1. The winding of the covering over the former F, which former is subsequently removed, forms a curved hollow covering or cushion which fits securely upon the bridge of the nose, and each transverse part of the covering E is capable of slight depressions to exactly fit the nose and hold the glasses more securely.

It is apparent that the particular shape of the pieces C and such details of construction may be varied without departing from my invention, and I do not limit myself to such minor details here shown.

In Fig. 5 is shown my invention adapted to the ordinary spectacles. In this case I prefer to wind the material upon a curved metal piece C, which is subsequently secured to the ordinary bridge of the spectacles by metal bands $d$ or suitable fasteners. This form, (shown in Fig. 5,) while embodying the inventions broadly, and to that extent part of the invention set out in this application, is not herein claimed specifically, as the specific construction thereof forms the subject-matter of another application bearing even date with this.

Having now described my invention, what I claim as new, and desire to secure by Letters Patent, is—

1. Eyeglasses or spectacles having a nose or bridge piece formed of horse-hair.

2. Eyeglasses or spectacles having a nose or bridge piece formed or horse-hair wound in a coil upon a metal foundation.

3. The combination, in eyeglasses or spectacles, of the main frame, with the support C and the winding of elastic material E thereon.

4. The combination of the nose-clasps of a pair of glasses with the metal strip or support C, having the clasps D, for attachment to the nose-clasps and the winding of elastic material E thereon.

5. The combination of the nose-clasps of a pair of glasses with the metal strip or support C, having the clasps D, for attachment to the nose-clasps and the bent parts $c$, and the winding of elastic material E thereon, having its ends secured by the parts $c$ of the support C.

In testimony of which invention I have hereunto set my hand, at Philadelphia, this 4th day of May, A. D. 1888.

STACY B. OPDYKE.

Witnesses:
  RICHARD S. CHILD, Jr.,
  ABNER J. DAVIS.